United States Patent
Kaplan et al.

(10) Patent No.: US 8,259,221 B1
(45) Date of Patent: Sep. 4, 2012

(54) SYSTEM AND METHOD FOR CHARGING RECHARGEABLE BATTERIES IN A DIGITAL CAMERA

(75) Inventors: Jonathan Kaplan, San Francisco, CA (US); John Louis Warpakowski Furlan, Belmont, CA (US); Paul Raymond Schaefer, Mountain View, CA (US); Edward Vernon Bacho, Sunnyvale, CA (US); Joseph Yao Hua Chu, San Jose, CA (US); Robert Lin, Los Gatos, CA (US); Richard Tobais Inman, San Francisco, CA (US); William Orner, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 524 days.

(21) Appl. No.: 12/424,488

(22) Filed: Apr. 15, 2009

(51) Int. Cl.
*H04N 5/225* (2006.01)
*H02J 7/00* (2006.01)

(52) U.S. Cl. .................. 348/372; 320/114; 348/207.1

(58) Field of Classification Search ............ 348/207.99, 348/372–376, 207.1; 320/103, 114, 106
See application file for complete search history.

(56) References Cited

U.S. PATENT DOCUMENTS

| | | | |
|---|---|---|---|
| 5,903,764 A * | 5/1999 | Shyr et al. ................. | 713/300 |
| 6,023,147 A * | 2/2000 | Cargin et al. .............. | 320/114 |
| 6,600,291 B2 * | 7/2003 | Pautet et al. .............. | 320/103 |
| 2004/0246341 A1 * | 12/2004 | Lee et al. ................. | 348/207.99 |

OTHER PUBLICATIONS

Eastman Kodak Company, "Kodak EasyShare Camera Dock User's Guide," 2005.

* cited by examiner

*Primary Examiner* — Chieh M Fan
*Assistant Examiner* — Ahmed A Berhan
(74) *Attorney, Agent, or Firm* — Patterson & Sheridan, LLP

(57) ABSTRACT

One embodiment of the present invention sets forth a digital camera configured to be powered by rechargeable nickel-metal hydride (NiMH) batteries. The digital camera includes one or more rechargeable NiMH batteries, and first internal circuitry configured to receive power from a universal serial bus (USB) port associated with an external power source and to charge the rechargeable NiMH batteries without removing the rechargeable NiMH batteries from the digital camera.

29 Claims, 10 Drawing Sheets

| A | B | C |
|---|---|---|
| D | E | F | ial camera provides a user with the
SYSTEM AND METHOD FOR CHARGING RECHARGEABLE BATTERIES IN A DIGITAL CAMERA

BACKGROUND OF THE INVENTION

1. Field of the Invention

The invention relates generally to digital cameras and, more specifically, to a system and method for charging rechargeable batteries in a digital camera.

2. Description of the Related Art

Digital camera technology has developed rapidly over the past decade. A broad variety of digital cameras are now available to meet the diverse needs of a wide spectrum of consumers. A conventional digital camera provides a user with the ability to capture and to store digital images and/or digital video electronically. Digital cameras may be powered by non-rechargeable batteries or, alternatively, by rechargeable batteries, such as Nickel-Metal Hydride (NiMH) batteries, Nickel-Cadmium (NiCAD) batteries, Lithium Polymer (Li-Poly) batteries, or Lithium-ion (Li-ion) batteries.

A digital camera powered by non-rechargeable batteries eventually exhausts the charge provided by the batteries and then requires replacement batteries to continue operating. The user of the digital camera is thus required to repeatedly purchase non-rechargeable batteries in order to provide further power to the digital camera. For this reason, some digital cameras are powered by rechargeable batteries.

A digital camera powered by rechargeable batteries eventually exhausts the charge provided by the rechargeable batteries, and the batteries can then be recharged to provide further power to the digital camera. With such designs, either an external charger or a charger internal to the camera may be implemented to recharge the rechargeable batteries.

When an external charger is implemented, the external charger is connected to a standard wall outlet or to a universal serial bus (USB) port on a personal computer (PC) for recharging purposes. For example, with digital cameras that are powered by rechargeable NiMH batteries and require an external charger, once the charge supplied by the rechargeable NiMH batteries is exhausted, the user typically has to remove the NiMH batteries from the digital camera and then load the NiMH batteries into the external charger. The external charger has to then be connected to either a standard wall outlet or to a USB port on a PC to recharge the NiMH batteries. However, if the user does not have access to a standard wall outlet or to a PC, or if the user does not have the external charger or any required cabling, the NiMH batteries cannot be recharged.

When an internal charger is implemented, the digital camera is usually coupled to an A/C transformer, which is then connected directly to a standard wall outlet for recharging purposes, or to a USB port on a PC or other power source. For example, with digital cameras that are powered by Li-ion batteries and have internal chargers, once the charge supplied by the rechargeable Li-ion batteries is exhausted, in some instances the user has to connect the digital camera to an A/C transformer and then connect the A/C transformer to a standard wall outlet to recharge the Li-ion batteries. In other instances, the user has to connect the digital camera to the USB port of a computer or other power source to recharge the batteries. In either case, if the user does not have access to a standard wall outlet, or if the user does not have the A/C transformer or any required cabling, the Li-ion batteries cannot be recharged and the camera will no longer function.

In an attempt to overcome some of the drawbacks of digital cameras powered only by rechargeable batteries, some digital cameras have been designed to be powered by either rechargeable batteries or non-rechargeable batteries. With such designs, however, the non-rechargeable batteries still have to be replaced, the user of the digital camera still has to have access to a standard wall outlet to recharge the rechargeable batteries, or the batteries must be removed from the digital camera in order to be charged from an A/C or USB power source. Further, as described above, a user typically also has to have access to either an external charger (and required cabling) or an A/C transformer in order to charge the rechargeable batteries.

As the foregoing illustrates, what is needed in the art is a digital camera that operates on both rechargeable and non-rechargeable batteries and implements a more user-friendly charging technique than those set forth above.

SUMMARY OF THE INVENTION

One embodiment of the present invention sets forth a digital camera configured to be powered by rechargeable nickel-metal hydride (NiMH) batteries. The digital camera includes one or more rechargeable NiMH batteries, and first internal circuitry configured to receive power from a universal serial bus (USB) port associated with an external power source and to charge the rechargeable NiMH batteries without removing the rechargeable NiMH batteries from the digital camera.

One advantage of the disclosed digital camera is that rechargeable NiMH batteries supply power to the camera, allowing the camera to be used for longer periods of time than conventional digital cameras powered by non-rechargeable batteries, such as regular Alkaline batteries. Further, the disclosed digital camera can be powered by either rechargeable NiMH batteries or non-rechargeable batteries that can be inserted into the same space within the camera, thereby allowing a compact design to be maintained. Circuitry within the charging unit is capable of reliably differentiating between rechargeable NiMH batteries and non-rechargeable batteries, which ensures that non-rechargeable batteries loaded into the digital camera are not mistakenly charged. The charging unit resides within the digital camera, and the digital camera includes a USB connector that enables the digital camera to be conveniently connected directly to an NC-to-D/C adapter or to a personal computer in order to charge the rechargeable batteries, without having to remove the batteries from the digital camera. Consequently, a user of the digital camera is not required to carry an external charger or additional connector cables around with the digital camera in order to charge the rechargeable NiMH batteries. In sum, the disclosed digital camera implements a substantially more flexible and user-friendly charging scheme relative to prior art digital camera designs.

Another embodiment of the present invention includes a digital camera that has a battery compartment configured to house either rechargeable NiMH batteries or non-rechargeable batteries, and a USB connector that enables the digital camera to be coupled directed to a USB port of an external power source in order to charge the rechargeable NiMH batteries. Yet another embodiment of the present invention includes a method for charging the rechargeable NiMH batteries when the digital camera is coupled to an external power source.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
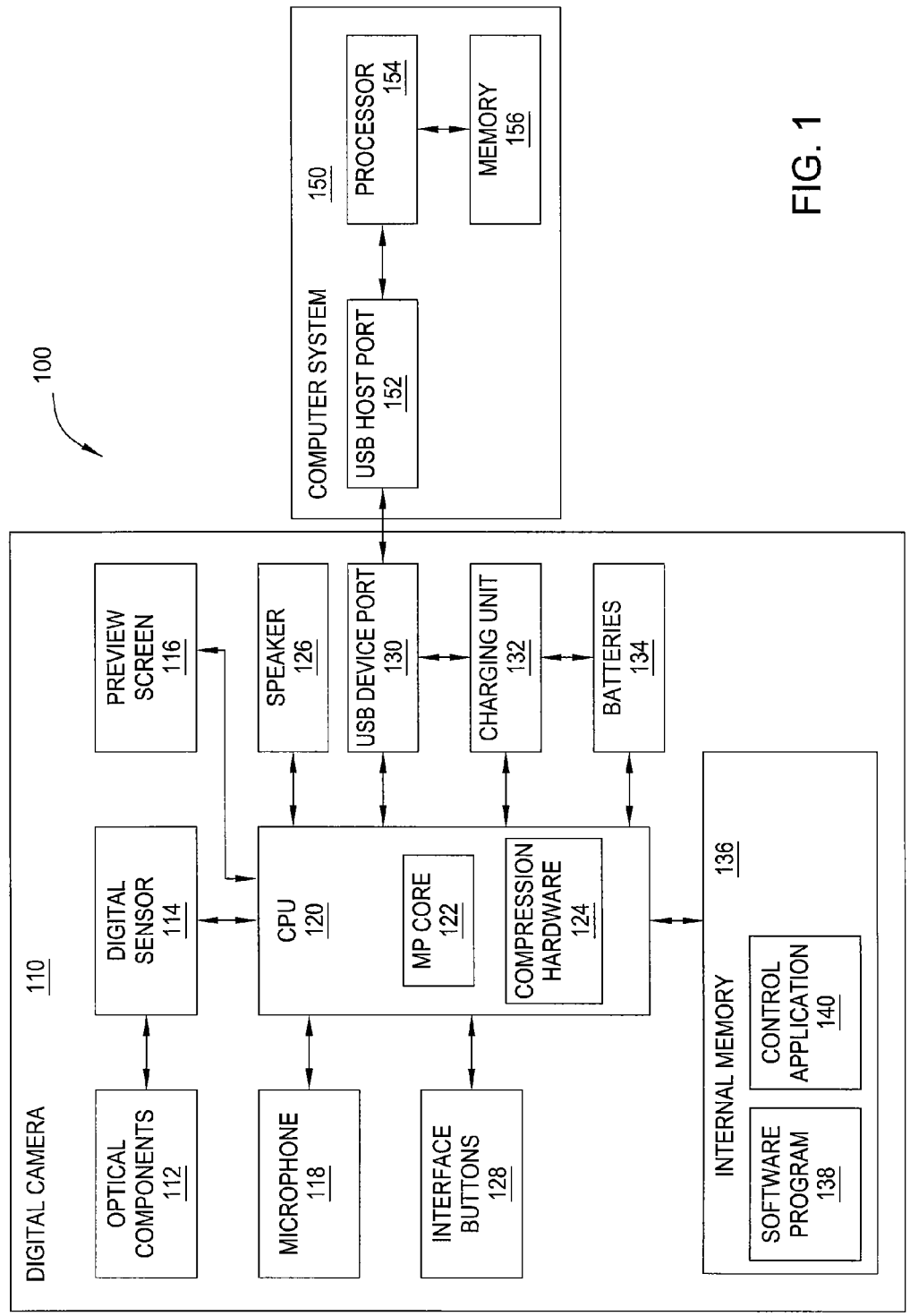
FIG. 1 is a conceptual illustration of a digital camera configured to implement one or more aspects of the invention.

FIG. 1 is a block diagram of a system 100 configured to implement one or more aspects of the invention. As shown, the system 100 includes a digital camera 110 and a computer system 150. The digital camera 110 is a hand-held device configured to capture video data, audio data and/or still image data. The digital camera 110 may include, without limitation, optical components 112, a digital sensor 114, a preview screen 116, a microphone 118, a central processing unit (CPU) 120, a speaker 126, interface buttons 128, a universal serial bus (USB) device port 130, a charging unit 132, one or more batteries 134, and internal memory 136.

The digital camera 110 captures video data or still image data associated with a particular scene via the optical components 112 and the digital sensor 114. The optical components could be, for example, a lens that focuses light rays onto the digital sensor 114 when directed towards the particular scene. The digital sensor 114 can then transform the focused light rays into video data or still image data that represents the particular scene. As the digital camera 110 captures video data, the microphone 118 captures audio data associated with the particular scene. Once captured, any of the video data, still image data and audio data can be stored in the internal memory 136.

The interface buttons 128 allow a user of the digital camera to control the operation of the digital camera 110. The interface buttons 128 include a power button and a capture button (none shown). The power button is configured to turn the digital camera ON and OFF. The capture button initiates the capture of video data or the capture of still image data depending on whether the digital camera 110 is in a video capture mode or a still image capture mode. In one embodiment, the interface buttons 128 include additional interface buttons such as, for example, a left button, a right button, an increase button, a decrease button, a display button, and/or a delete button used to implement various functions of the digital camera 110. The additional interface buttons could be used, for example, to select a mode of operation of the digital camera 110 or to delete video data and/or still image data previously captured by the digital camera 110. The interface buttons 128 may each be implemented as capacitive-touch buttons, mechanical buttons, induction buttons, analog-resistive buttons, or any other technically feasible button type.

The CPU 120 controls the operations of the digital camera 110 and may be implemented as a single chip or as a combination of multiple chips. In one embodiment, the CPU 120 is a system on chip (SOC). The CPU 120 includes a microprocessor (MP) 122 and compression hardware 124. The MP 122 is configured to execute a control application 140 included in the internal memory 136 to implement the different functions of the digital camera 110. The compression hardware 124 performs compression operations with video data, still image data and/or audio data stored in the internal memory 136.

The preview screen 116 is configured to display a preview of the video data or the still image data that may be captured when the capture button is pressed. The preview screen 116 is also configured to display video data or still image data previously captured using the digital camera 110 or previously captured using another device and stored in the internal memory 136. When the preview screen 116 displays video data stored in the internal memory 136, the speaker 126 outputs the audio data stored in the internal memory 136 that is associated with that video data.

The internal memory 136 may comprise either volatile memory, such as dynamic random access memory (DRAM), non-volatile memory, such as a hard disk or a flash memory module, or a combination of both volatile and non-volatile memory. In one embodiment, the internal memory 136 stores a software program 138 implemented as a set of program instructions and configured to coordinate operation between the interface buttons 128 and the other components of the digital camera 110 when those program instructions are executed by the CPU 120. In one embodiment, the internal memory 136 comprises non-volatile flash memory configured to store video data.

In various embodiments, the digital camera 110 may be coupled to the computer system 150 via the USB device port 130. The computer system 150 includes a USB host port 152 to which the USB device port 130 may be connected. In one embodiment, the USB device port 130 comprises an integrated connector that is connected directly to the USB host port 152. In another embodiment, the USB device port 130 may be connected to the USB host port 152 with an external USB cable. The computer system 150 may be any type of computing device, such as a laptop or a desktop computer, a server computer, or a video processing kiosk. The computer system 150 includes a processor 154 and a memory 156. Other components included in the computer system 150, such as a display device, a disk drive, user input devices, and the like, are omitted to avoid obscuring embodiments of the present invention.

The USB device port 130 allows data to be transferred between the digital camera 110 and the computer system 150. This data may include video data, still image data and/or audio data. In certain embodiments, the USB device port 130 receives power from an external power source. In one such embodiment, an external alternating current (A/C) power source, such as a standard wall outlet, comprises the external power source. The USB device port 130 is coupled to the external A/C power source via an A/C-to-direct current (D/C) adapter, and the USB device port 130 draws power from external NC power source via the NC-to-D/C adapter. The A/C-to-D/C adapter includes a USB adapter port to which the USB device port 130 may be coupled to receive power from the external A/C power source. The USB adapter port includes one or more resistors that can be detected by the digital camera 110 to determine that the digital camera 110 is connected to the external A/C power source via the A/C-to-D/C adapter. In another embodiment, the computer system 150 comprises a 5V, 500 mA external power source, the USB device port 130 is coupled to the computer system 150 via the USB host port 152, and the USB device port 130 draws power from the computer system 150 via the USB host port 152. In further embodiments, the computer system 150 comprises a 5V, 1 A power source and the USB host port 152 complies with the USB 3.0 specification When the digital camera 110 is connected to an external power source, the components of the digital camera 110 are powered by the external power source and do not draw power from the batteries 134. Otherwise, the components of the digital camera 110 are powered by the batteries 134, which may comprise rechargeable batteries or, alternatively, non-rechargeable batteries such as, for example, non-rechargeable alkaline batteries.

In one embodiment, both the rechargeable batteries and the non-rechargeable batteries have the same general form factor and fit into the same space in the digital camera 110 with the same orientation. In another embodiment, the form factor may correspond to the form factor of a AA non-rechargeable alkaline battery. In further embodiments, the rechargeable batteries may be capable of supplying more power over a longer period of time than non-rechargeable batteries having the same form factor. When the batteries 134 comprise, for example, rechargeable NiMH batteries, the batteries 134 may be recharged by the charging unit 132 when the digital camera 110 is connected to an external power source, such as the computer system 150 via the USB host port 152 or an external A/C power source via an A/C-to-D/C adapter.

As further described below in conjunction with FIG. 2, the charging unit 132 includes internal circuitry configured to detect whether the batteries 134 comprise rechargeable batteries as opposed to non-rechargeable batteries. When the batteries 134 comprise rechargeable batteries, and the USB device port 130 is connected to an external power source, the charging unit 132 can be used to recharge the batteries. Further, the internal circuitry of the charging unit 132 is configured to charge the batteries 134 at different rates depending on the type of external power source to which the USB device port 130 is connected. The charging unit 132 receives command signals from the CPU 120 to initiate the recharging of the batteries 134 and indicate the rate at which the batteries 134 are being recharged. When the batteries 134 comprise rechargeable batteries, but the USB device port 130 is not connected to an external power source, the internal circuitry isolates the batteries 134 from the charging unit 132. Isolating the batteries 134 in this fashion conserves power that would otherwise leak out of the batteries 134 and into the charging unit 132.

Figure 2:
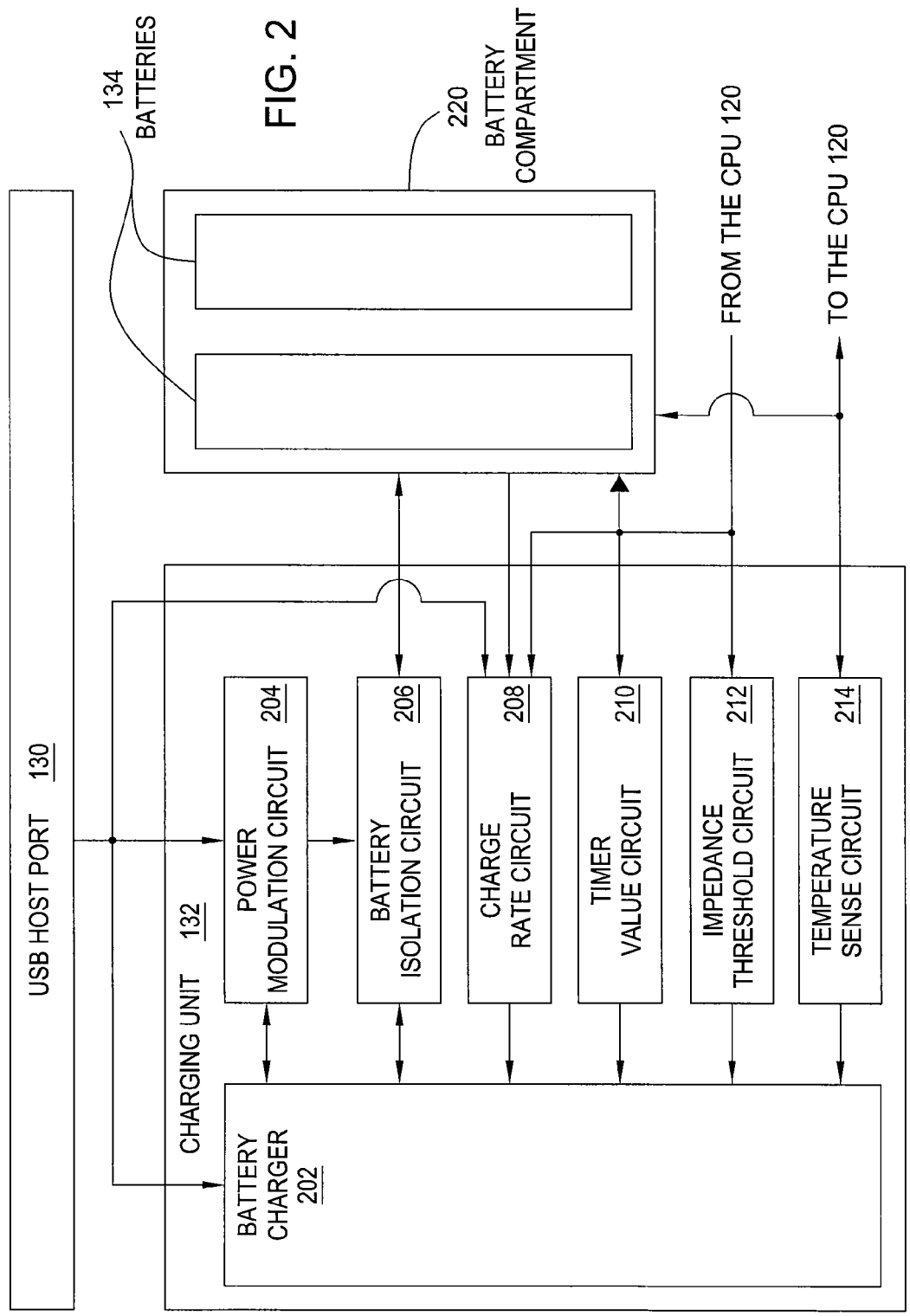
FIG. 2 is a more detailed conceptual illustration of the charging unit of FIG. 1, according to one embodiment of the invention.

FIG. 2 is a more detailed conceptual illustration of the charging unit 132 of FIG. 1, according to one embodiment of the invention. The following description is directed primarily towards the aspects of the charging unit 132 relevant to charging the batteries 134 when those batteries comprise, for example, rechargeable NiMH batteries.

As shown, the charging unit 132 includes a battery charger 202 coupled to a power modulation circuit (PMC) 204, a battery isolation circuit (BIC) 206, a charge rate circuit (CRC) 208, a timer value circuit (TVC) 210, an impedance test level circuit (ITC) 212, and a temperature sense circuit (TSC) 214. The BIC 206, the CRC 208, and the TSC 214 are each coupled to a battery compartment 220 that includes the batteries 134. The battery compartment 220 includes a space corresponding to a particular form factor. The rechargeable NiMH batteries or the non-rechargeable batteries comprising the batteries 134 have this same form factor and can be housed within the battery compartment 220 based on having the same relative orientation within the battery compartment 220.

The battery charger 202 is a circuit configured to implement the charging of the batteries 134 when the batteries 134 comprise rechargeable NiMH batteries. In one embodiment, the battery charger 202 is a Maxim DS2712 battery charger. The battery charger 202 is connected to one or more positive terminals associated with the batteries 134 via the PMC 204 and the BIC 206. The battery charger also is connected to a negative terminal of the batteries 134 via the CRC 208. Based on an amount of current supplied to the positive terminals of the batteries 134 and an amount of current returned from the batteries 134, the battery charger 202 generates and transmits control signals to the PMC 204. The control signals, in turn, cause the PMC 204 to modulate the power supplied to the batteries 134.

The PMC 204 is configured to modulate power received from the USB device port 130 and to supply the modulated power to the batteries 134 via the BIC 206. The PMC 204 supplies the modulated power based on the control signals received from the battery charger 202. In one embodiment, the PMC 204 receives power from the USB device port 130 in the form of a D/C voltage. The PMC 204 includes a switching transistor that converts this D/C voltage into a square voltage waveform. The switching transistor outputs the square voltage waveform to an inductor within the PMC 204. The inductor receives the square voltage waveform and outputs modulated power having a constant voltage to both the battery charger 202 and the batteries 134 via the BIC 206. In one embodiment, the inductor within the PMC 204 is a 10 µH inductor.

The PMC 204 further includes a Schmitt trigger buffer that receives modulation signals from the battery charger 202 and provides a push-pull output to the gate of the switching transistor. The push-pull output of the Schmitt trigger buffer reduces the switching time of the switching transistor, thereby reducing the amount of power consumed by the switching transistor. In situations where the amount of power supplied by the USB device port 130 is limited (for example, where the USB device port 130 is connected to the USB host port 152 of the computer system 150), implementing the Schmitt trigger buffer, as described, increases the total power that can be supplied to the batteries 134.

When the USB device port 130 is connected to an external power source, the BIC 206 is configured to route the modulated power received from the PMC 204 to the batteries 134. However, when the USB device port 130 is not connected to an external power source, the BIC 206 isolates the batteries 134 from the battery charger 202 by opening the connections between the batteries 134 and the battery charger 202. Isolating the batteries 134 in this fashion reduces the amount of power that leaks from the batteries into the battery charger 202 when the USB device port 130 is not connected to an external power source.

The battery charger 202 determines the amount of charge current supplied to the positive terminals of the batteries 134 based on the current returned from the negative terminal of the batteries 134 through a primary current sense resistor. The CRC 208 is configured to manipulate the rate at which the batteries 134 are charged by regulating the voltage detected at the primary current sense resistor. In this fashion, the CRC 208 may cause the battery charger 202 to implement an increase or a decrease in the amount of charge current supplied to the positive terminals of the batteries 134. The CRC 208 is configured to modify the current through the primary current sense resistor by placing a secondary current sense resistor in parallel with the primary current sense resistor. In this configuration, the current through the primary current sense resistor is decreased and, in response, the battery charger 202 increases the current supplied to the batteries 134. The batteries 134 are then charged at a first charge rate.

In one embodiment, the first charge rate corresponds to a 680 mA charge current. When the secondary current sense resistor is not placed in parallel with the primary current sense resistor, the battery charger 202 does not increase the charge current supplied to the batteries 134, and the batteries 134 are charged at a second charge rate. In one embodiment, the second charge rate corresponds to a 340 mA charge current. In this embodiment, the USB device port 130 draws 500 mA from the computer system 150. The digital camera 110 consumes 200 mA of current for internal processes, leaving 300 mA for charging the batteries 134. The charging unit 132 includes an inductor within the PMC 204 that increases the 300 mA current from the computer system 150 to a 340 mA charge current. The charging unit 132 then charges the batteries 134 with the 340 mA charge current. In alternative embodiments, the CRC 208 is configured to implement other charge rates in addition to the first charge rate and the second charge rate.

The CRC 208 implements the first charge rate when the CPU 120 asserts a CH_FAST signal. The CPU 120 asserts the CH_FAST signal when the USB device port 130 is connected to and detects a proprietary A/C-to-D/C adapter coupled to an external A/C power source. In one embodiment, the proprietary A/C-to-D/C adapter includes resistors that signal the presence of the A/C-to-D/C adapter to the digital camera 110 when coupled to the digital camera 110. When the NC-to-D/C adapter is coupled to the NC power source, the A/C power source is capable of supplying enough power to support the first charge rate.

The CRC 208 implements the second charge rate when the CPU 120 asserts the CH_ENABLE signal and de-asserts the CH_FAST signal. The CPU 120 asserts the CH_ENABLE signal and de-asserts the CH_FAST signal when the USB device port 130 is connected to the USB host port 152 of the computer system 150, the digital camera 110 is successfully enumerated as a USB device, and the computer system 150 grants permission to the digital camera 110 to consume 500 mA via the USB host port 152. In one embodiment, the USB host port 152 is capable of supplying only enough power to support the second charge rate.

When the USB device port 130 is not connected to an external power source and the digital camera 110 is powered by the batteries 134, the CRC 208 short-circuits the primary current sense resistor. The primary current sense resistor is required by the battery charger 202 only during charging and otherwise dissipates power from the batteries 134 needlessly. By short circuiting the primary current sense resistor when the USB device port 130 is not connected to an external power source, the CRC 208 conserves battery power.

Depending on the rate at which the batteries 134 are charged, the battery charger 202 causes the PMC 204 to supply power to the batteries 134 for different amounts of time. For example, the battery charger 202 may charge the batteries 134 for N minutes while charging at the first charge rate, but then charge the batteries 134 for 2*N minutes while charging at the second charge rate. The TVC 210 controls the timeout values for how long the batteries 134 are charged, by setting a charge timeout value. If the timeout values are exceeded during charging without a successful charge termination, then the charging unit 132 transitions to the next charging state. The TVC 210 sets a first charge timeout value when the USB device port 130 is connected to an A/C power source, and sets a second charge timeout value (that is greater than the first charge timeout value to allow more charging time) when the USB device port 130 is connected to the USB host port 152 of the computer system 150. More specifically, the CPU 120 asserts a CH_ENABLE signal as well as the CH_FAST signal in order to cause the TVC 210 to set the charge timeout value to the first charge timeout value corresponding to the first charge rate. By contrast, the CPU 120 asserts the CH_ENABLE signal and de-asserts the CH_FAST signal in order to cause the TVC 210 to set the charge timeout value to the second charge timeout value corresponding to the second charge rate, where the second charge timeout value is greater than the first charge timeout value.

The CPU 120 is further configured to detect when the batteries 134 comprise rechargeable NiMH batteries as opposed to non-rechargeable batteries and to set the charge timeout value to a valid value only when the presence of NiMH batteries is detected. When the CPU 120 de-asserts the CH_ENABLE and CH_FAST signals by setting both signals low (signaling that the batteries 134 comprise non-rechargeable batteries), the battery charger 202 is deactivated, so that the batteries 134 cannot be mistakenly charged. In one embodiment, the batteries 134 are included within a proprietary NiMH battery pack having a pin configured to fit into a hole within the battery compartment 220. The pin causes a NiMH detector switch within the TVC 210 to assert a BT_PACK signal indicating that the NiMH battery pack is present within the battery compartment 220. In response to the BT_PACK signal, the TVC 210 allows the charge timeout value to enable the battery charger 202 if the CPU 120 asserts CH_ENABLE. The BT_PACK signal takes precedence over the CH_ENABLE and the CH_FAST signals, so that in situations where the CPU 120 asserts the CH_ENABLE signal and the batteries 134 do not comprise the proprietary NiMH battery pack (e.g., due to a software and/or firmware error), then the batteries 134 are not mistakenly charged. The BT_PACK signal can also be read by the CPU 120, allowing the CPU 120 to detect when the proprietary NiMH battery pack is present. Alternatively, the pin on the NiMH battery pack may activate a mechanical switch within the battery compartment 220 physically closing a circuit and allowing current to flow through the circuit.

The battery charger 202 is also configured to detect when the batteries 134 comprise rechargeable NiMH batteries or alternate rechargeable battery types as opposed to non-rechargeable batteries. Since rechargeable NiMH batteries have a lower impedance level than non-rechargeable batteries, the impedance level of the batteries 134 may indicate whether the batteries 134 comprise rechargeable NiMH batteries as opposed to non-rechargeable batteries. The battery charger 202 determines the impedance level of the batteries 134 based on the difference between the charging voltage of the batteries 134 and the open circuit voltage of the batteries 134 (i.e., the voltage of the batteries 134 when charge current is not flowing into the batteries 134). The battery charger 202 determines this difference by pausing charging at a particular interval and determining the voltage of the batteries 134 compared to the voltage of the batteries 134 while charging. The battery charger 202 also determines the impedance level of the batteries 134 based on the rate at which the batteries 134 are being charged (e.g., the first charge rate or the second charge rate). If the impedance level exceeds a certain impedance threshold value, then the battery charger 202 ceases charging of the batteries 134. The ITC 210 is configured to adjust for different charge current levels when measuring the impedance level of the batteries according to the rate at which the batteries 134 are charged. The ITC 210 modifies the value of an impedance test resistor (not shown) to maintain a constant impedance value for the different charge rates based on whether the CPU 120 asserts or de-asserts the CH_FAST signal, indicating the first charge rate or the second charge rate. When the CPU 120 asserts the CH_FAST signal, the ITC 210 modifies the impedance test resistor for the higher charge rate. By contrast, when the CPU 120 de-asserts the CH_FAST signal, the ITC 210 modifies the impedance test resistor for the lower charge rate.

In addition to the foregoing, the battery charger 202 is configured to cease charging the batteries 134 when the temperature of the batteries 134 exceeds a particular temperature threshold value. Specifically, the TSC 214 includes a thermistor that measures the temperature of the batteries 134. The TSC 214 then provides a temperature reading to the battery charger 202 and also to the CPU 120. When the temperature reading exceeds the temperature threshold value, the battery charger 202 disables charging and reports a fault condition on a status pin. The CPU 120 may also be coupled to an additional temperature sensor. When the battery charger 202 reports a fault condition, the CPU 120 determines whether the fault condition is caused by an overtemperature event based on a reading from the additional temperature sensor. When a fault condition is caused by an overtemperature event, the CPU 120 may attempt to re-enable the battery charger 202 and resume charging once the temperature has reduced to an acceptable level. This functionality protects the batteries 134 in situations where the batteries 134 may start to become too hot, such as, for example, when charging at the fast charge rate is complete, when the batteries 134 are defective, or when the batteries 134 comprise non-rechargeable batteries. Persons skilled in the art will recognize that, to the extent the battery charger 202 has more than two charge rates, the charging scheme disclosed herein may be modified to implement charge cycles that are different than or in addition to those described herein.

Additionally, the CPU 120 can use the temperature information from the additional temperature sensor to determine that the current temperature is within an acceptable range to enable charging. In one embodiment, the CPU 120 analyzes how the voltage of the batteries 134 changes over time. Based on this analysis and based on a temperature reading from the batteries 134, the CPU 120 can determine whether a fault occurs during charging. In such situations, the CPU 120 can be configured to terminate the charging operation.

When the batteries 134 include more than one battery, the battery charger 202 monitors the voltage of each battery individually during charging and disables charging when the voltage of either battery exceeds a certain voltage threshold. Disabling charging in this fashion is a safety mechanism that prevents the charging on non-rechargeable batteries when the NiMH detector switch is defeated or fails.

Lastly, the battery charger 202 is configured to cease charging when the charge cycle implemented by the battery charger 202 has completed. As is well-known, a charge cycle includes an initial charge phase, a topping off phase, and a trickle charge phase. The battery charger 202 will successfully transition from the initial charge phase to the topping off phase when the voltage of the batteries 134 reaches a peak and then declines, or when the voltage remains constant for a certain interval of time. In one embodiment, the charging unit 132 supplies an amount of power to the batteries 134 that is sufficient to reliably detect when the charge cycle is complete. Any combination of the foregoing options for limiting and/or ceasing charging of the batteries 134 may be employed. All or some of these options may be employed based on design, redundancy and/or safety considerations.

Figure 3:
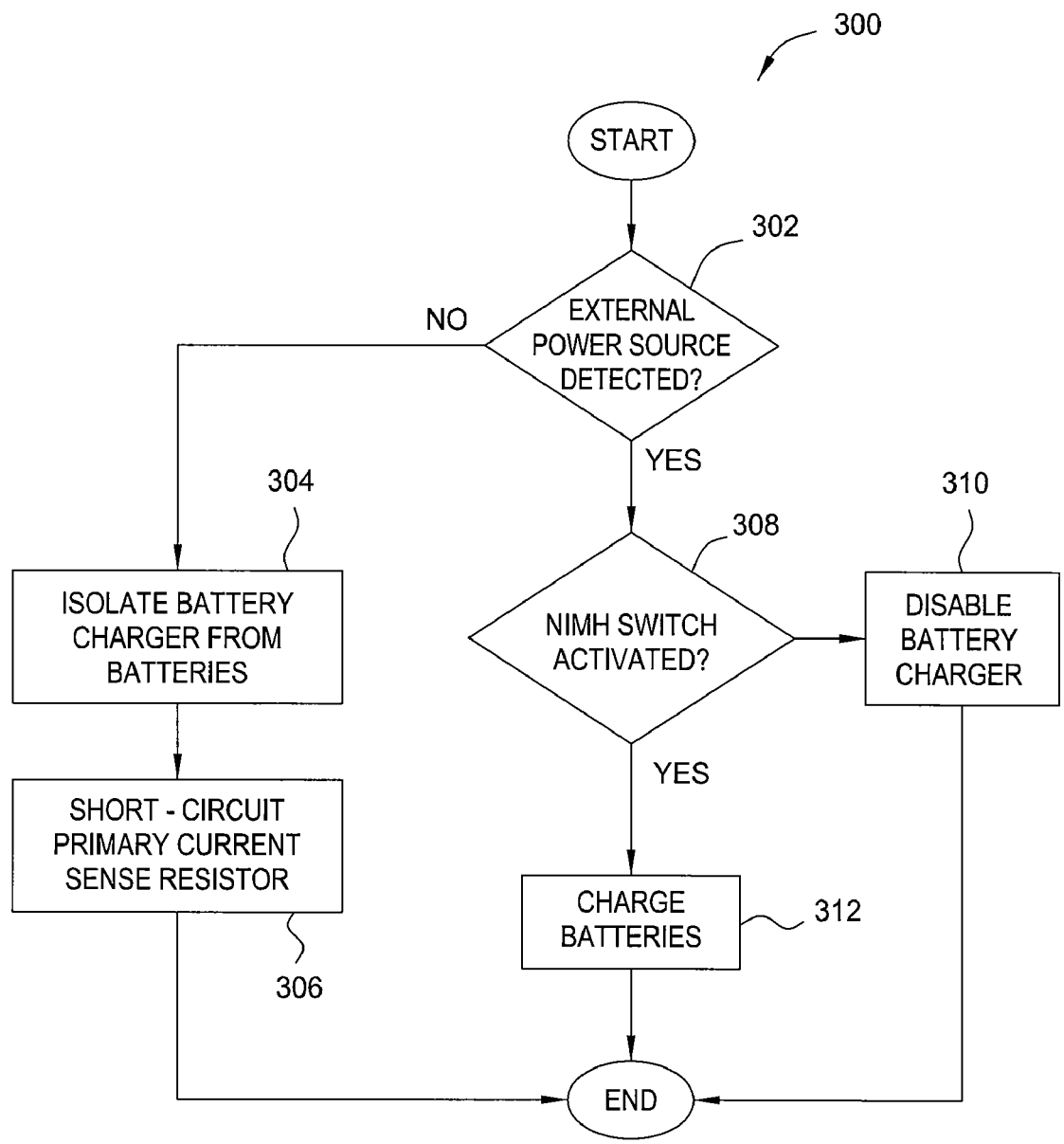
FIG. 3 is a flowchart of method steps for detecting the presence of rechargeable batteries within a digital camera, according to one embodiment of the invention.

FIG. 3 is a flowchart of method steps for detecting the presence of rechargeable batteries within a digital camera, according to one embodiment of the invention. Persons skilled in the art will understand that, although the method 300 is described in conjunction with the systems of FIGS. 1-2, any system configured to perform the method steps, in any order, is within the scope of the present invention.

As shown, the method 300 begins at step 302, where the charging unit 132 determines whether the USB device port 130 is connected to an external power source. Again, the USB device port 130 may be connected to an external A/C power source, such as a standard wall outlet, via an NC-to-D/C adapter that includes a USB adapter port or, alternatively, may be connected to the computer system 150 via the USB port 152. When the USB connector 130 is connected to the external A/C power source via the NC-to-D/C adapter, the USB device port 130 can be coupled directly to the USB adapter port or coupled to the USB adapter port via a USB cable. If the charging unit 132 does not detect an external power source, then the method 300 proceeds to step 304.

At step 304, the BIC 206 isolates the battery charger 202 from the batteries 134. When USB device port 130 is not connected to an external power source, the battery charger 202 may allow power to leak from the batteries 134. By isolating the battery charger 202 from the batteries 134 in this fashion, battery power can be conserved.

At step 306, the CRC 208 short-circuits the primary current sense resistor, which is configured to measure the current returned from the batteries 134 during charging. When the USB device port 130 is not connected to an external power source, the primary current sense resistor is unnecessary and results in unnecessary power loss during operation of the digital camera 110. By short circuiting the primary current sense resistor in this fashion, battery power can be conserved.

Referring back now to step 302, if the charging unit 132 determines that the USB device port 130 is connected to an external power source, then the method 300 proceeds to step 308. At step 308, the TVC 210 determines whether a NiMH detector switch is activated. The NiMH detector switch indicates whether the batteries 134 comprise a proprietary NiMH battery pack. If the TVC 210 determines that the NiMH detector switch is not activated, then the method 300 proceeds to step 410, where the TVC 210 disables the battery charger 202 by floating a connection to a timer pin on the battery charger 202.

At step 308, if the TVC 210 determines that the NiMH detector switch is activated, then the method 300 proceeds to step 312, and the battery charger 202 charges the batteries 134, if operating conditions so warrant.

Figure 4:
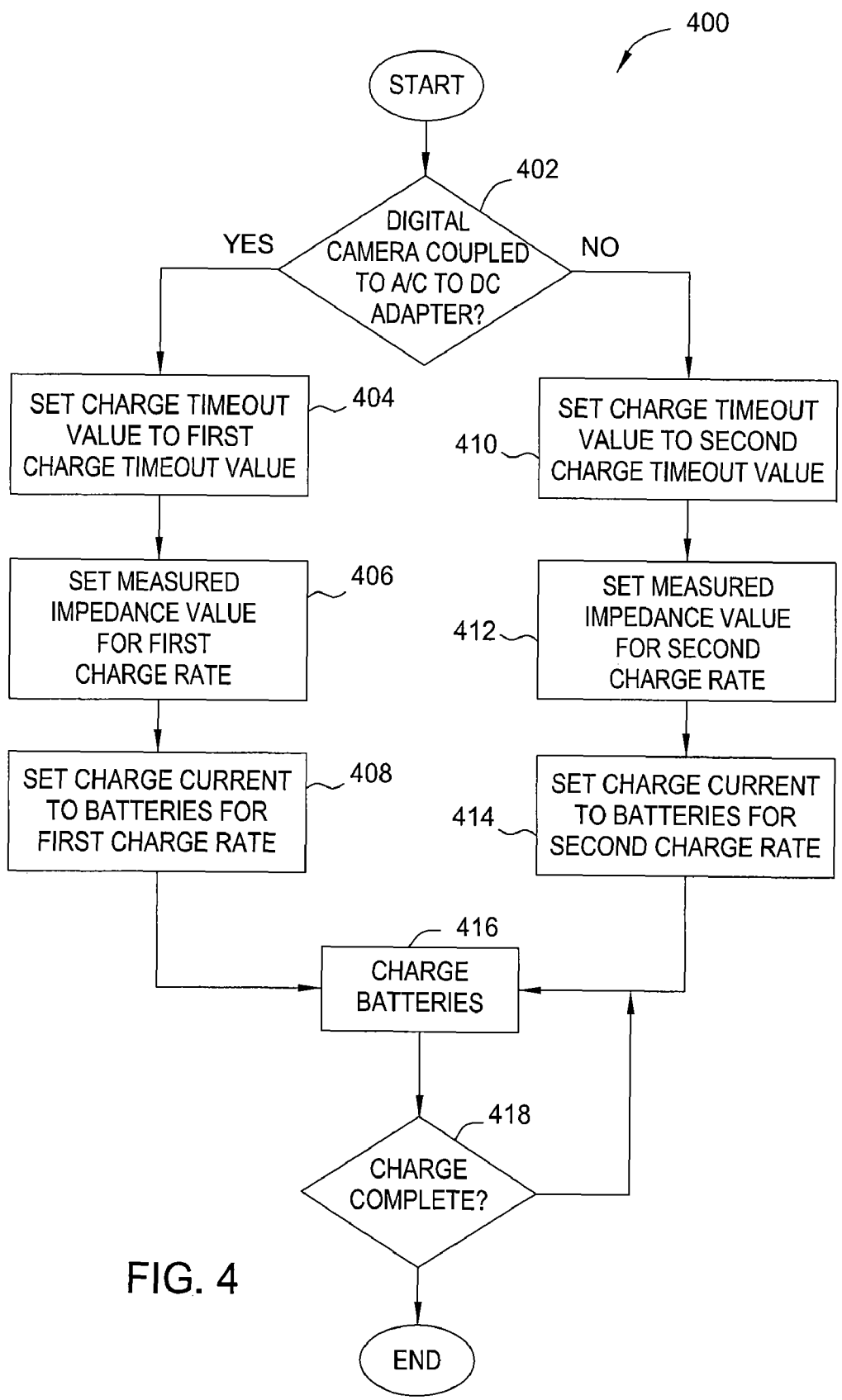
FIG. 4 is a flowchart of method steps for charging rechargeable batteries residing within a digital camera, according to one embodiment of the invention.
Figure 5A:
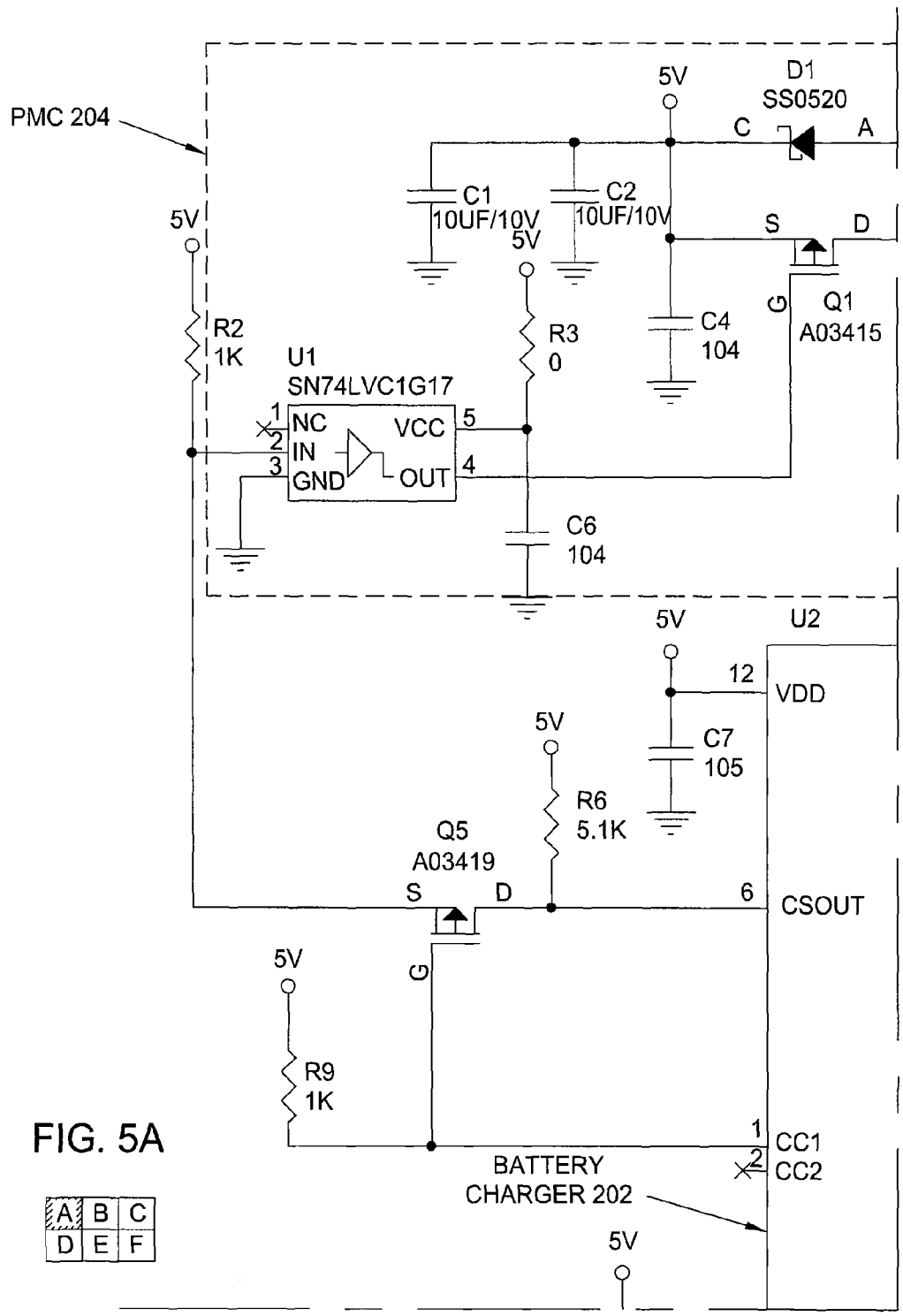
FIGS. 5A-5F are various portions of a circuit diagram illustrating an exemplary implementation of the charging unit of FIG. 2, according to one embodiment of the invention.
Figure 5B:
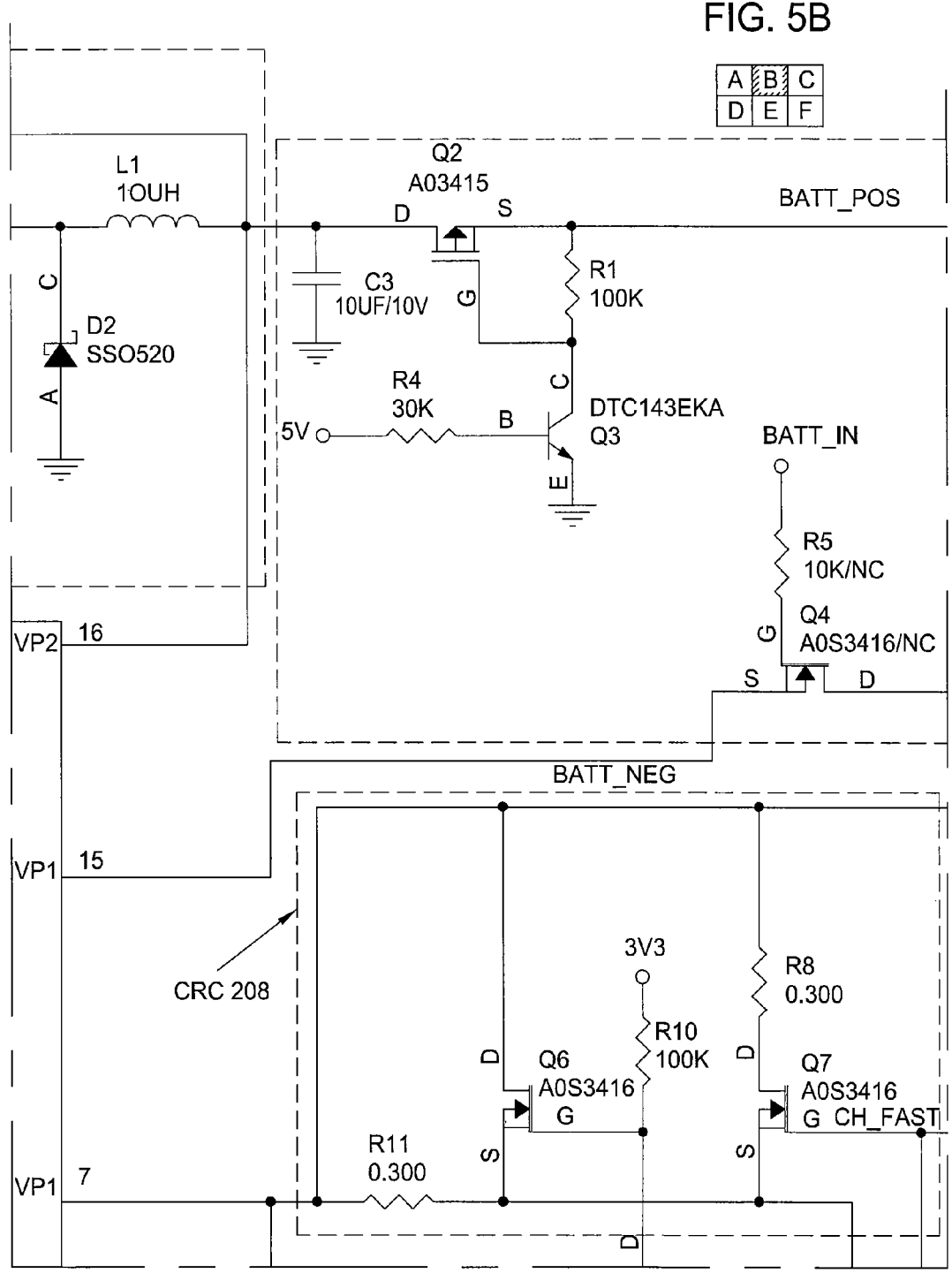
Figure 5C:
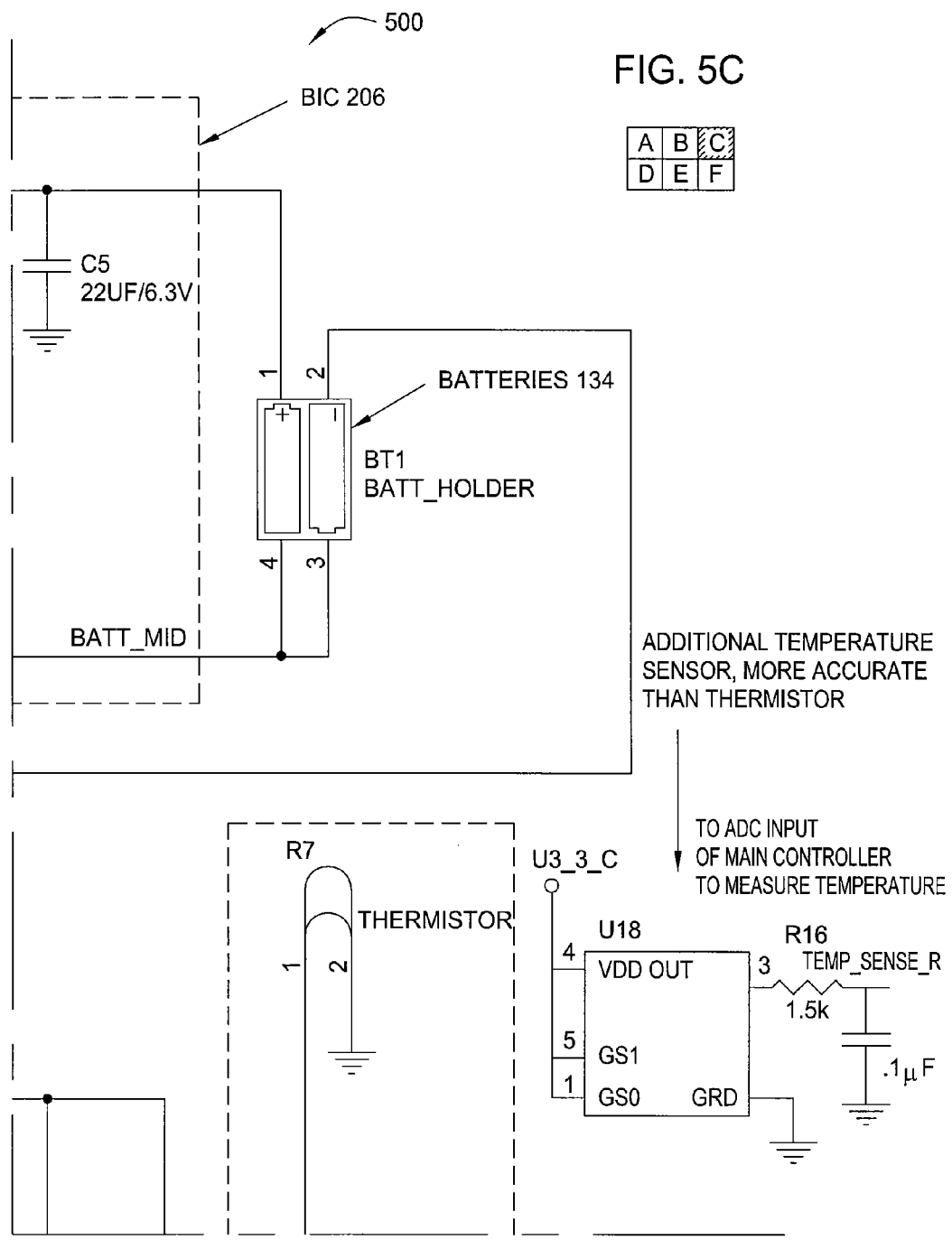
Figure 5D:
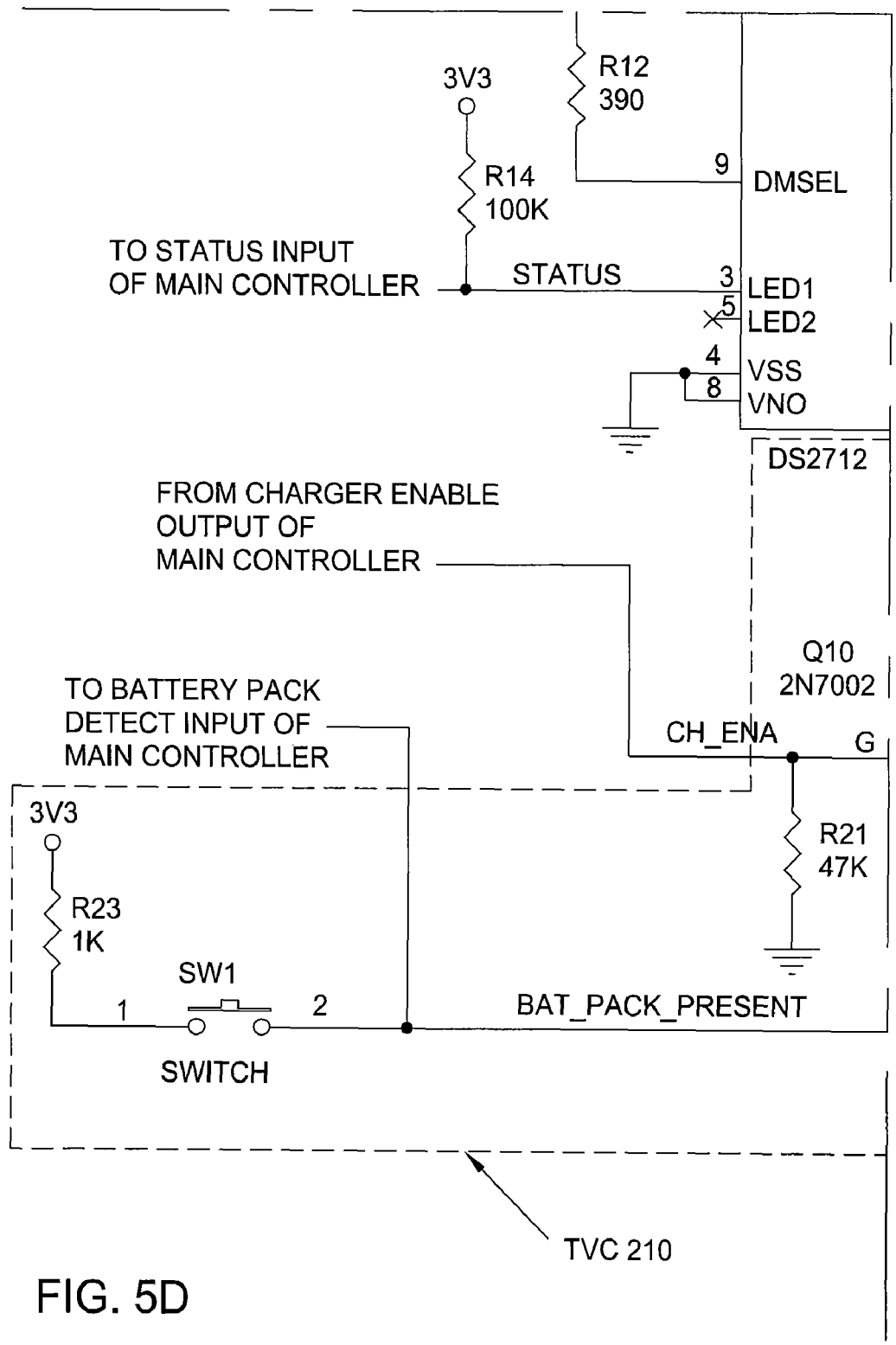
Figure 5E:
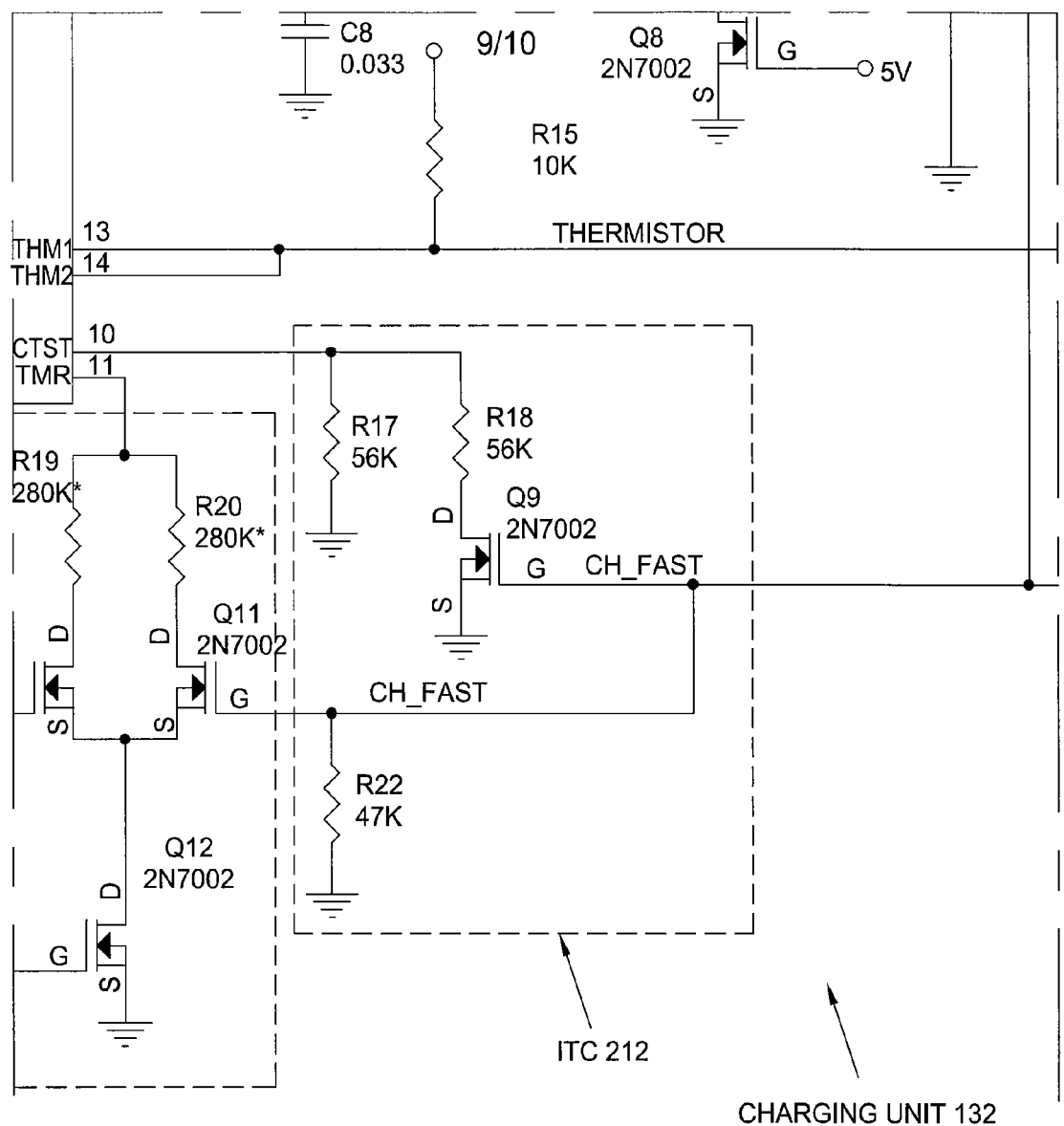
Figure 5F:
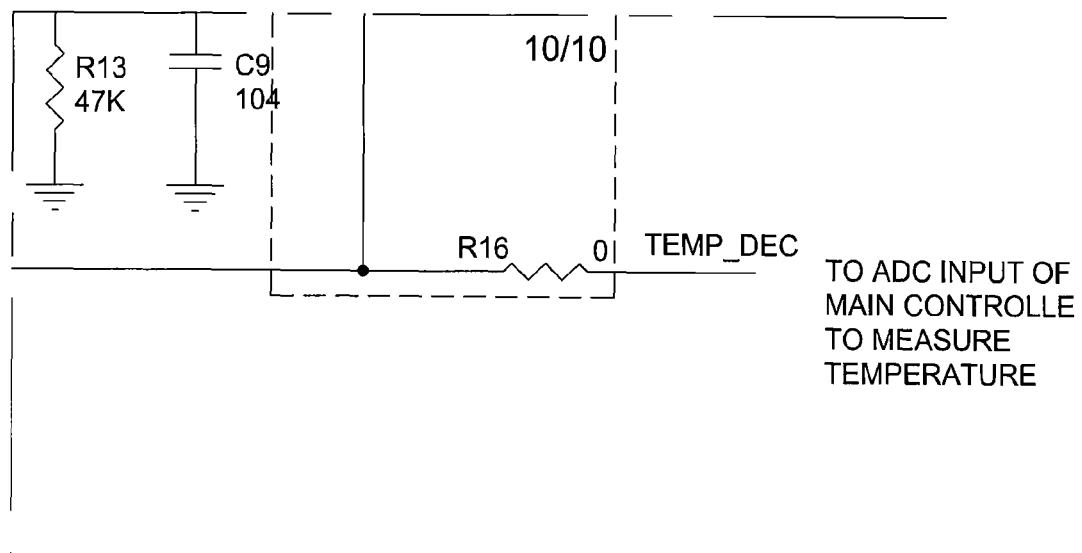

FIG. 4 is a flowchart of method steps for charging rechargeable batteries residing within a digital camera, according to one embodiment of the invention. Persons skilled in the art will understand that, although the method 400 is described in conjunction with the systems of FIGS. 1-2, any system configured to perform the method steps, in any order, is within the scope of the present invention. The method 400 is implemented when the USB device port 130 is connected to an external power source.

As shown, the method 400 begins at step 402, where the charging unit 132 determines whether the USB device port 130 is coupled to an A/C-to-D/C power source. The A/C-to-D/C power source may be derived from a USB adapter port in an A/C-to-D/C adapter coupled to an external NC power source, such as a standard wall outlet. The A/C-to-D/C adapter includes one or more resistors configured to signal the presence of the A/C-to-D/C adapter to the digital camera 110 via the USB adapter port. The USB device port 130 may connect to the USB adapter port to receive power. In one embodiment, CPU 120 determines whether the USB device port 130 is coupled to the A/C-to-D/C power source and sets the battery charger 202 to enable the TVC 210 and the CRC 208 accordingly. If the USB device port 130 is connected to the NC-to-DIG power source, then the method 400 proceeds to step 404. In one embodiment, the method 400 proceeds to step 404 only when fast charging is enabled.

At step 404, the TVC 210 sets a charge timeout value of the battery charger 202 to a first charge timeout value corresponding to a first charge rate. The first charge timeout value determines a maximum duration of time that the battery charger 202 charges the batteries. If the batteries 134 are charged for an amount of time that exceeds the first charge timeout value, then the battery charger transitions to the next charging state in the charge cycle. The first charge timeout value thus represents a safety mechanism that prevents overcharging of the batteries 134. The TVC 210 sets the charge timeout value to the first charge timeout value when the CPU 120 asserts a CH_ENABLE signal and a CH_FAST signal. In one embodiment, the TVC 210 sets the charge timeout value to a valid value to enable the battery charger 202 only when the TVC 210 asserts a BT_PACK signal indicating that a NIMH battery pack is present.

At step 406, the ITC 212 modifies the impedance circuitry of the battery charger for the first charge rate, which changes the impedance value associated with the impedance circuitry so that the measured impedance value of the batteries 134 is maintained at substantially the same value regardless of the charge rate. When charging the batteries 134, the battery charger 202 compares the measured impedance value of the batteries 134 to an impedance threshold value to determine whether charging should continue. If the measured impedance level exceeds the impedance threshold value, then the battery charger 202 ceases charging and reports a fault condition. The battery charger 202 may also compare the measured impedance value of the batteries 134 to the impedance threshold value to determine whether the batteries 134 comprise rechargeable NiMH batteries as opposed to non-rechargeable batteries. If the measured impedance value exceeds the impedance threshold value, then the battery charger 202 will not charge the batteries 134.

At step 408, the battery charger 202 sets the charge current supplied to the batteries 134 to implement the first charge rate. The CRC 208 modifies an amount of current returned from the batteries 134 to the battery charger 202 through a primary current sense resistor by adding a secondary current sense resistor in parallel with the first current sense resistor. Modifying the current through the primary current sense resistor in this fashion causes the battery charger 202 to transmit control signals to the PMC 202. In response, the PMC 202 increases the charge current supplied to the batteries 134, thus increasing the rate at which the batteries 134 are charged and implementing the first charge rate.

At step 416, the battery charger 202 charges the batteries 134. The battery charger charges the batteries 134 by transmitting control signals to the PMC 204 that cause the PMC 202 to supply charge current to the batteries 134.

Referring now back to step 402, if the charging unit 132 determines that the USB device port 130 is not connected to an A/C-to-D/C power source, then the USB device port 130 is connected to the computer system 150 via the USB host port 152. Once the computer system 150 enumerates the digital camera 110 and grants permission to the digital camera 110 to consume 500 mA from the USB host port 152, the method 400 proceeds to step 410.

At step 410, the TVC 210 sets the charge timeout value to a second charge timeout value corresponding to a second charge rate. The second charge timeout value determines a maximum duration of time that the battery charger 202 charges the batteries. If the batteries 134 are charged for an amount of time that exceeds the second charge timeout value, then the battery charger 202 transitions to the next charging state in the charge cycle. The second charge timeout value thus represents a safety mechanism that prevents overcharging of the batteries 134. The TVC 210 sets the charge timeout value to the second charge timeout value when the CPU 120 asserts a CH_ENABLE signal and de-asserts a CH_FAST signal. In one embodiment, the TVC 210 sets the charge timeout value to a valid value to enable the battery charger 202 only when the TVC 210 asserts a BT_PACK signal indicating that a NiMH battery pack is present.

At step 412, the ITC 212 modifies the impedance circuitry of the battery charger for the second charge rate, which changes the impedance value associated with the impedance circuitry so that the measured impedance value of the batteries 134 is maintained at substantially the same value regardless of the charge rate. When charging the batteries 134, the battery charger 202 compares the measured impedance value of the batteries 134 to an impedance threshold value to determine whether charging should continue. If the measured impedance level exceeds the impedance threshold value, then the battery charger 202 ceases charging. The battery charger 202 may also compare the measured impedance value of the batteries 134 to determine whether the batteries 134 comprise rechargeable NiMH batteries as opposed to non-rechargeable batteries. If the measured impedance value exceeds the impedance threshold value, then the battery charger 202 will not charge the batteries 134.

At step 414, the battery charger 202 sets the charge current supplied to the batteries 134 to implement the second charge rate. The CRC 208 disconnects the secondary current sense resistor, thereby removing the secondary current sense resistor from the circuit and causing the battery charger 202 to transmit control signals to the PMC 204. In response, the PMC 204 decreases the charge current supplied to the batteries 134. Decreasing the charge current supplied to the batteries 134 causes the batteries 134 to be charged at the second charge rate. The method 400 then proceeds to step 416, as previously described herein.

At step 418, the battery charger 202 determines whether charging of the batteries 134 is complete by monitoring a status output pin on the battery charger 202. The CPU 120 may also de-assert the CH_ENABLE and CH_FAST signals, causing the battery charger 202 to cease charging the batteries 134. In one embodiment, the battery charger 202 ceases charging when the charge cycle completes without any errors. In another embodiment, the CPU 120 analyzes how the voltage of the batteries 134 changes over time. Based on this analysis and based on a temperature reading from the batteries 134, the CPU 120 determines whether a fault occurs during charging.

Once charging has been completed, the external power source may be disconnected, and the digital camera 110 may be used to capture video data, still image data and/or audio data, as described above in conjunction with FIG. 1. When the external power is disconnected, the digital camera 110 is powered by the batteries 134. When the batteries 134 comprise NiMH batteries, the batteries 134 may be charged by implementing the techniques described above. Alternatively, when the batteries 134 comprise non-rechargeable batteries, the non-rechargeable batteries may be replaced by additional non-rechargeable batteries or by rechargeable NiMH batteries.

FIGS. 5A-5F are various portions of a circuit diagram 500 illustrating an exemplary implementation of the charging unit 132 of FIG. 2, according to one embodiment of the invention. As shown, specific regions of the circuit diagram 500 correspond to the battery charger 202, PMC 204, the BIC 206, the CRC 208, the TVC 210, and the ITC 212. In addition, the circuit diagram 500 includes the batteries 134. Those skilled in the art will recognize that the circuit diagram 500 represents only one possible implementation of the charging unit 132 described above in FIGS. 1-4 and in no way limits the scope of the present invention.

In sum, a digital camera is provided that can be powered with either rechargeable batteries or with non-rechargeable batteries. The digital camera includes internal circuitry configured to detect the presence of rechargeable batteries as opposed to non-rechargeable batteries. The digital camera also includes an internal charging unit that can be used to charge the rechargeable batteries. A connector internal to the digital camera is used to connect the digital camera to an external power source, such as a personal computer (PC) or a standard wall outlet. The connector can be directly connected to a universal serial bus (USB) host port on the PC (without any additional cabling or accessories) and then derive power from the PC via the USB host port. Alternatively, the connector can be connected to a USB adapter port on an A/C-to-D/C adapter connected to a standard wall outlet, and the digital camera can derive power from the standard wall outlet via the A/C-to-D/C adapter. Based on whether the external power source is a personal computer or standard wall outlet, the internal circuitry configures the charging unit differently. When the digital camera is connected to the standard wall outlet, the internal circuitry configures the charging unit to charge the rechargeable batteries at a rate particular to the power supplied by the standard wall outlet. When the digital camera is connected to a PC, the internal circuitry configures the charging unit to charge the rechargeable batteries at a rate particular to the power supplied by the PC. When the digital camera is not connected to an external power source, the internal circuitry isolates the batteries from the charging unit, thus reducing power leakage from the batteries.

One advantage of the disclosed digital camera is that rechargeable NiMH batteries supply power to the camera, allowing the camera to be used for longer periods of time than conventional digital cameras powered by non-rechargeable batteries, such as regular Alkaline batteries. Further, the disclosed digital camera can be powered by either rechargeable NiMH batteries or non-rechargeable batteries, thereby providing a user of the digital camera with broader set of options for powering the digital camera. The rechargeable NiMH batteries and the non-rechargeable batteries can be inserted into the same space within the camera, thereby allowing a compact design to be maintained. Circuitry within the charging unit is capable of reliably differentiating between rechargeable NIMH batteries and non-rechargeable batteries, which ensures that non-rechargeable batteries loaded into the digital camera are not mistakenly charged. The charging unit resides within the digital camera, and the digital camera includes a USB connector that enables the digital camera to be conveniently connected directly to an A/C-to-D/C adapter or to a personal computer in order to charge the rechargeable batteries, without having to remove the batteries from the digital camera. Consequently, a user of the digital camera is not required to carry an external charger or additional connector cables around with the digital camera in order to charge the rechargeable NiMH batteries. Another advantage is that the charging unit may be connected to different types of external power sources that deliver different amounts of power, creating more flexibility in how the rechargeable NiMH batteries used with the digital camera may be charged. In sum, the disclosed digital camera implements a substantially more flexible and user-friendly charging scheme relative to prior art digital camera designs.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A digital camera configured to be powered by rechargeable nickel-metal hydride (NiMH) batteries, the digital camera comprising:
   one or more rechargeable NiMH batteries;
   first internal circuitry configured to receive power from a universal serial bus (USB) port associated with an external power source and to charge the rechargeable NiMH batteries without removing the rechargeable NiMH batteries from the digital camera; and
   second internal circuitry configured to:
      detect the presence of the rechargeable NiMH batteries within the digital camera as opposed to non-rechargeable batteries;
      allow the rechargeable NiMH batteries to be charged when the presence of the rechargeable NiMH batteries is detected;
      upon detecting the presence of the rechargeable NiMH batteries within the digital camera, set a first charge timeout value based on the internal circuitry supplying a first charge current to the rechargeable NiMH batteries for a first duration of time when the received power has a first current level and to set a second charge timeout value based on the first internal circuitry supplying a second charge current to the rechargeable NiMH batteries for a second duration of time when the received power has a second current level, and wherein the first duration of time is less than the second duration of time, and the first current level is greater than the second current level.

2. The digital camera of claim 1, wherein the external power source comprises a personal computer or an alternating current power source.

3. The digital camera of claim 2, wherein the USB port comprises a USB port of the personal computer or a USB adapter port of an alternating current-to-direct current adapter that is configured to connect to the alternating current power source.

4. The digital camera of claim 1, wherein the second internal circuitry is further configured to disable the first internal circuitry when the presence of the rechargeable NiMH batteries within the digital camera is not detected.

5. The digital camera of claim 1, wherein the first charge current is substantially equivalent to the difference between the first current level and an amount of current required by components of the digital camera other than the first and second internal circuitry, and the second charge current is substantially equivalent to the difference between the second current level and the amount of current required by the components of the digital camera other than the first and second internal circuitry.

6. The digital camera of claim 1, wherein the second internal circuitry is further configured to determine whether the external charging source has the first current level or the second current level when the presence of the rechargeable NiMH batteries within the digital camera is detected, and to charge the rechargeable NiMH batteries at a first charge rate corresponding to the first current level or at a second charge rate corresponding to the second current level.

7. The digital camera of claim 1, further comprising a battery compartment configured to house batteries having a first form factor, wherein the rechargeable NiMH batteries and the non-rechargeable batteries have the first form factor and align within the battery compartment at a first orientation.

8. The digital camera of claim 7, wherein the battery compartment is coupled to a detector switch within the second internal circuitry that is configured to detect the presence of the rechargeable NiMH batteries within the battery compartment.

9. A digital camera configured to be powered by rechargeable nickel-metal hydride (NiMH) batteries or non-rechargeable batteries, the digital camera comprising:
 a central processing unit (CPU) configured to assert one or more control signals;
 a universal serial bus (USB) device port configured to receive power from a USB port associated with an external power source;
 a battery compartment configured to house the rechargeable NiMH batteries or the non-rechargeable batteries; and
 a charging unit configured to supply a charge current to the rechargeable NiMH batteries using power received by the USB device port when the rechargeable NiMH batteries are housed within the battery compartment, wherein the charging unit includes a timeout value circuit configured to determine a charge timeout value defining a duration of time that the charge current is supplied to the rechargeable NiMH batteries before transitioning to a next charging state, the timeout value circuit includes a detector switch configured to detect the presence of rechargeable NiMH batteries, as opposed to non-rechargeable batteries, within the battery compartment, and the timeout value circuit is configured to set the charge timeout value to a first charge timeout value when (i) the CPU asserts a first signal that enables charging of the rechargeable NiMH batteries, (ii) the CPU asserts a second signal that enables fast charging of the rechargeable NiMH batteries, and (iii) the detector switch detects the rechargeable NiMH batteries within the battery compartment.

10. The digital camera of claim 9, wherein the external power source comprises a personal computer or an alternating current power source.

11. The digital camera of claim 10, wherein the USB port comprises a USB port of the personal computer or a USB adapter port on an alternating current-to-direct current adapter that is configured to connect to the alternating current power source.

12. The digital camera of claim 9, wherein the timeout value circuit is further configured to set the charge timeout value to a second charge timeout value when the CPU asserts the first signal, the CPU de-asserts the second signal, and the detector switch detects the rechargeable NiMH batteries within the battery compartment.

13. The digital camera of claim 12, wherein the timeout value circuit is further configured to set the charge timeout value to disable the charging unit when the detector switch does not detect the rechargeable NiMH batteries within the battery compartment.

14. The digital camera of claim 12, further including a charge rate circuit configured to determine a charge rate defining a rate at which the charge current is supplied to the rechargeable NiMH batteries.

15. The digital camera of claim 14, wherein the charge rate circuit is further configured to detect whether the potential power available from the USB port has a first current level or a second current level that is less than the first current level.

16. The digital camera of claim 15, wherein the charge rate circuit includes:
 a primary current sense resistor configured to route current returned from a negative terminal associated with the rechargeable NiMH batteries when the rechargeable NiMH batteries are housed within the battery compartment, wherein the charge rate is determined based on the amount of current routed through the primary current sense resistor; and
 a secondary current sense resistor configured to be placed in parallel with the primary current sense resistor when the power received by the USB device port has a first current level, resulting in the charge rate being set to a first charge rate corresponding to the first current level, wherein the charge rate is set to a second charge rate when the secondary sense resistor is not placed in parallel with the primary current sense resistor, and the first charge rate is greater than the second charge rate.

17. The digital camera of claim 9, wherein the charging unit further includes a battery isolation circuit configured to isolate the rechargeable NiMH batteries or the non-rechargeable batteries from the charging unit when the USB device port does not receive the power from the USB port.

18. The digital camera of claim 9, wherein the charging unit further includes:
 a battery charger configured to charge the rechargeable NiMH batteries;
 a power modulation circuit configured to modulate the power received by the USB device port from the USB port and to output modulated power having a constant average current;
 a voltage detection circuit configured to disable the battery charger when the voltage of any of the rechargeable NiMH batteries exceeds a known value during charging.

19. The digital camera of claim 18, further comprising an impedance threshold circuit configured to disable the battery charger when an impedance value of the rechargeable NiMH batteries or the non-rechargeable batteries exceeds an impedance threshold value.

20. The digital camera of claim 19, further comprising a temperature sense circuit configured to disable the battery charger when the temperature of the rechargeable NiMH batteries or the non-rechargeable batteries exceeds a temperature threshold value.

21. The digital camera of claim 19, wherein the impedance threshold circuit is further configured such that a measured impedance value of the rechargeable NiMH batteries is maintained at a substantially constant value when the CPU asserts a first signal that enables charging of the rechargeable NiMH batteries and a second signal that enables fast charging of the rechargeable NiMH batteries at a first charge rate, and such that the measured impedance value of the rechargeable NiMH batteries is maintained at a substantially constant value when the CPU asserts the first signal and de-asserts the second signal.

22. The digital camera of claim 18, wherein the power modulation circuit includes:
    a switching transistor configured to convert the power received by the USB device port from a constant direct current voltage to a square voltage waveform;
    a Schmitt trigger buffer having a push-pull output coupled to the switching transistor and configured to reduce a switching time associated with the switching transistor; and
    an inductor configured to receive the square voltage waveform from the switching transistor and to output the modulated power having a constant current to the battery charger.

23. The digital camera of claim 22, where the inductor is at least a 10 μH inductor.

24. The digital camera of claim 9, wherein the battery compartment is further configured to house batteries having a first form factor, wherein the rechargeable NiMH batteries and the non-rechargeable batteries have the first form factor and align within the battery compartment at a first orientation.

25. The digital camera of claim 24, wherein the battery compartment is coupled to a detector switch configured to detect the presence of a proprietary NiMH battery pack within the battery compartment.

26. A method for charging rechargeable Nickel Metal Hydride (NiMH) batteries in a digital camera configured to house both the rechargeable NiMH batteries and non-rechargeable batteries, the method comprising:
    determining that batteries within the digital camera comprise rechargeable NiMH batteries;
    determining that the digital camera is coupled to a universal serial bus (USB) port associated with an external power source; and
    configuring a battery charger within the digital camera to supply a charge current to the rechargeable NiMH batteries using the power supplied by the USB port by setting a charge timeout value to a first charge timeout value when the external power source comprises an alternating current power source, or setting the charge timeout value to a second charge timeout value when the external power source comprises a personal computer, wherein the first charge timeout value is less than the second charge timeout value, the battery charger setting a charge rate for the rechargeable NiMH batteries to a first charge rate when the external power source comprises the alternating current power source, or setting the charge rate to a second charge rate when the external power source comprises the personal computer, wherein the first charge rate is greater than the second charge rate.

27. The method of claim 26, wherein the step of configuring the battery charger within the digital camera to supply the charge current to the rechargeable NiMH batteries comprises maintaining a measured impedance value of the rechargeable NiMH batteries at a substantially constant value when the external power source comprises an alternating current power source, or maintaining the measured impedance value of the rechargeable NiMH batteries at a substantially constant value when the external power source comprises a personal computer.

28. The method of claim 26, wherein the step of determining that the batteries within the digital camera comprise rechargeable NiMH batteries comprises determining that a physical detector switch has been activated by the rechargeable NiMH batteries.

29. The method of claim 26, wherein the first charge rate is provided to the NiMH batteries for a first duration of time that is less than a second duration of time during which the second charge rate is provided to the NiMH batteries.

* * * * *

UNITED STATES PATENT AND TRADEMARK OFFICE
CERTIFICATE OF CORRECTION

| | |
|---|---|
| PATENT NO. | : 8,259,221 B1 |
| APPLICATION NO. | : 12/424488 |
| DATED | : September 4, 2012 |
| INVENTOR(S) | : Kaplan et al. |

It is certified that error appears in the above-identified patent and that said Letters Patent is hereby corrected as shown below:

In Summary of the Invention:

Column 2, Line 43, please delete "NC-to-D/C" and insert -- A/C-to-D/C -- therefor;

In Detailed Description:

Column 4, Line 64, please delete "NC" and insert -- A/C -- therefor;

Column 4, Line 64, please delete "NC-to-D/C" and insert -- A/C-to-D/C -- therefor;

Column 7, Line 33, please delete "NC-to-D/C" and insert -- A/C-to-D/C -- therefor;

Column 7, Line 34, please delete "NC" and insert -- A/C -- therefor;

Column 10, Line 14, please delete "NC-to-D/C" and insert -- A/C-to-D/C -- therefor;

Column 10, Line 18, please delete "NC-to-D/C" and insert -- A/C-to-D/C -- therefor;

Column 10, Line 65, please delete "NC" and insert -- A/C -- therefor;

Column 11, Line 8, please delete "NC-to-DIG" and insert -- A/C-to-D/C -- therefor.

Signed and Sealed this
Fifth Day of February, 2013

Teresa Stanek Rea
*Acting Director of the United States Patent and Trademark Office*